US012698734B2

(12) United States Patent
Hoops et al.

(10) Patent No.: US 12,698,734 B2
(45) Date of Patent: Aug. 4, 2026

(54) PISTON WITH COMBUSTION STABILIZING BOWL

(71) Applicant: Caterpillar Inc., Peoria, IL (US)

(72) Inventors: Christopher M. Hoops, Bellingham, WA (US); Sean Jeffery Moser, Bellingham, WA (US); Adam J. Clute, Lafayette, IN (US); Andrew Joseph Loetz, West Lafayette, IN (US); Aaron Ness, Battle Ground, IN (US); Tyler M. Kackley, Bellingham, WA (US)

(73) Assignee: Caterpillar Inc., Peoria, IL (US)

( * ) Notice: Subject to any disclaimer, the term of this patent is extended or adjusted under 35 U.S.C. 154(b) by 20 days.

(21) Appl. No.: 18/611,847

(22) Filed: Mar. 21, 2024

(65) Prior Publication Data

US 2025/0297569 A1 Sep. 25, 2025

(51) Int. Cl.
*F02B 23/06* (2006.01)

(52) U.S. Cl.
CPC ...... *F02B 23/0627* (2013.01); *F02B 23/0621* (2013.01); *F02B 23/0624* (2013.01)

(58) Field of Classification Search
CPC .............. F02B 23/0627; F02B 23/0621; F02B 23/0624
See application file for complete search history.

(56) References Cited

U.S. PATENT DOCUMENTS 4,532,898 A 8/1985 Hayakawa et al.
4,721,080 A * 1/1988 Moriyasu ............ F02B 23/0636 123/279
6,152,101 A * 11/2000 Parsi .................. F02B 23/0693 123/193.6
6,161,518 A 12/2000 Nakakita et al.
6,868,817 B2 3/2005 Liu
7,243,862 B2 7/2007 Dingle
7,942,126 B2 * 5/2011 Zoller ................ F02B 23/0651 123/298
8,869,770 B2 10/2014 Bazyn et al.
10,184,388 B1 * 1/2019 Ahmad ..................... F02F 3/26
10,294,876 B2 5/2019 Laget et al.
10,400,663 B2 9/2019 Ness et al.
10,815,871 B2 10/2020 Saad et al.
11,118,533 B1 9/2021 Anders et al.
(Continued)

FOREIGN PATENT DOCUMENTS

EP 2063081 8/2016
FR 2880385 7/2006
(Continued)

*Primary Examiner* — Kurt Philip Liethen

(57) ABSTRACT

A piston for engine may include an annular body including a combustion bowl defining a volume and surrounded on a top side thereof by an annular crown portion defining a top squish surface with include an inner edge defining an opening to the combustion bowl. The opening may include an area for combustion gases to enter the bowl during a compression stroke of the piston. The combustion bowl may include a reentrant surface that defines a tangent that forms a reentrant angle with the top squish surface. The reentrant angle may range from 28.0 degrees to 32.0 degrees. A ratio of a bowl volume to an area of the entry opening may ranges from 45 mm to 52 mm. A ratio of a bowl volume to the reentrant angle may range from 12 cc/deg to 15 cc/deg.

7 Claims, 3 Drawing Sheets

(56) References Cited

U.S. PATENT DOCUMENTS

| | | | | |
|---|---|---|---|---|
| 11,293,339 | B2 | 4/2022 | Saad et al. | |
| 11,415,041 | B2 | 8/2022 | Chiera et al. | |
| 11,519,359 | B1 * | 12/2022 | Ravisankar | F02F 3/28 |
| 11,754,017 | B2 * | 9/2023 | Tsubaki | F02F 3/28<br>123/294 |
| 2009/0188481 | A1 * | 7/2009 | Zhu | F02B 23/08<br>123/661 |
| 2010/0108044 | A1 | 5/2010 | Liu | |
| 2015/0020765 | A1 * | 1/2015 | Pierpont | F02F 3/28<br>123/27 R |
| 2017/0058824 | A1 * | 3/2017 | Weiss | F02F 3/26 |
| 2017/0159549 | A1 * | 6/2017 | Uehara | F02F 3/28 |

FOREIGN PATENT DOCUMENTS

| | | |
|---|---|---|
| IN | 201621045122 | 12/2019 |
| JP | 2012207627 | 10/2012 |
| WO | 2011055055 | 5/2011 |

* cited by examiner

PISTON WITH COMBUSTION STABILIZING BOWL

TECHNOLOGICAL FIELD

The present disclosure relates generally to pistons that are used in internal combustion engines having a contoured piston bowl geometry with a reentrant surface. More specifically, the present disclosure relates to a piston having a contoured piston bowl geometry with a reentrant surface that may improve combustion stability in a low compression natural gas engine.

BACKGROUND

Internal combustion engines are widely used throughout the world for purposes ranging from vehicle propulsion to operation of pumps and compressors, to generation of electrical power. Typical internal combustion engines employ a plurality of pistons that reciprocate in cylinder bores to rotate a crankshaft in response to a controlled combustion reaction producing a rapid pressure and temperature rise to drive the pistons. For decades, engineers have experimented with a wide variety of different fuels, various exhaust treatment apparatuses and technologies, and different operating strategies in efforts to improve engine operation, reliability, and performance.

In recent years considerable engineering resources have been directed at developing pistons optimized for various applications. Depending on engine type, a piston may be formed with a specified combustion face geometry intended to interact with flows of fuel, air, and/or exhaust during operation to various ends including optimizing emissions and/or efficiency, to mitigate or otherwise control in-cylinder temperatures and/or mechanical wear or corrosion, and for various other purposes. It has been observed that oftentimes seemingly quite minor changes to piston geometry can have outsized effects upon engine operation and performance, and the results of toggling any one variable respecting piston geometry can often be quite unpredictable. Moreover, compounding the difficulties in optimizing piston design, the addition or removal of piston volume, particularly upon the combustion face, affects geometric compression ratio, oftentimes requiring other modifications to piston or overall engine and supporting system design to maintain compression ratio at a desired level. Depending upon fuel type and a great many different operating parameters and different engine applications, optimized piston designs can have widely varying geometries.

India Publ. Pat. Application Ser. No. 20/162,1045122 A (the '122 patent application) discloses a piston with a recessed combustion chamber on the piston head for improving the speed of combustion. The piston may further comprise the recessed combustion chamber faced towards a cylinder head with an injector. The injector is a fuel injector for introduction of fuel into the combustion chamber, where the mixture of fuel and air is allowed to burn. The inner structural design of the combustion chamber may be formed into a circular shape of a rotating body with an axis in the direction of the translatory movement of the piston. At the piston head, an opening is formed by configuring a series of interconnected lobes in the shape of a flower. The complete assembly further increases the speed of combustion enabled by better mixing of air and fuel which results in lowering the NOx emission and particulate matter emission.

SUMMARY

In one or more examples, a piston may be configured to reciprocate in the bore of an engine. The piston may include an annular body including a combustion bowl defining a volume and surrounded on a top side thereof by an annular crown portion defining a top squish surface. The top squish surface may include an inner edge defining an opening to the combustion bowl. The opening may include an area for combustion gases to enter the bowl during a compression stroke of the piston. The combustion bowl may include a reentrant surface that extends axially downwardly and radially outwardly relative to the top squish surface and defines a tangent that forms a reentrant angle with the top squish surface. The reentrant angle may range from 28.0 degrees to 32.0 degrees.

In one or more examples, a piston may be configured to reciprocate in the bore of an engine. The piston may include an annular body including a combustion bowl defining a bowl volume and surrounded on a top side thereof by an annular crown portion defining a top squish surface. The top squish surface may include an inner edge defining an entry opening to the combustion bowl. The entry opening may include an area for combustion gases to enter the bowl during a compression stroke of the piston. The combustion bowl may include a reentrant surface that extends axially downwardly and radially outwardly relative to the top squish surface and defines a tangent that forms a reentrant angle with the top squish surface. A ratio of a bowl volume to an area of the entry opening may range from approximately 45 mm to approximately 52 mm.

In one or more examples, a piston may be configured to reciprocate in a bore of an engine. The piston may include an annular body including a combustion bowl defining a bowl volume and surrounded on a top side thereof by an annular crown portion defining a top squish surface. The top squish surface may include an inner edge defining an opening to the combustion bowl. The opening may have an area for combustion gases to enter the bowl during a compression stroke of the piston. The combustion bowl may include a reentrant surface that extends axially downwardly and radially outwardly relative to the top squish surface and defines a tangent that forms a reentrant angle with the top squish surface. A ratio of a bowl volume to the reentrant angle may range from approximately 12 cc/deg to approximately 15 cc/deg.

DETAILED DESCRIPTION

Figure 1:
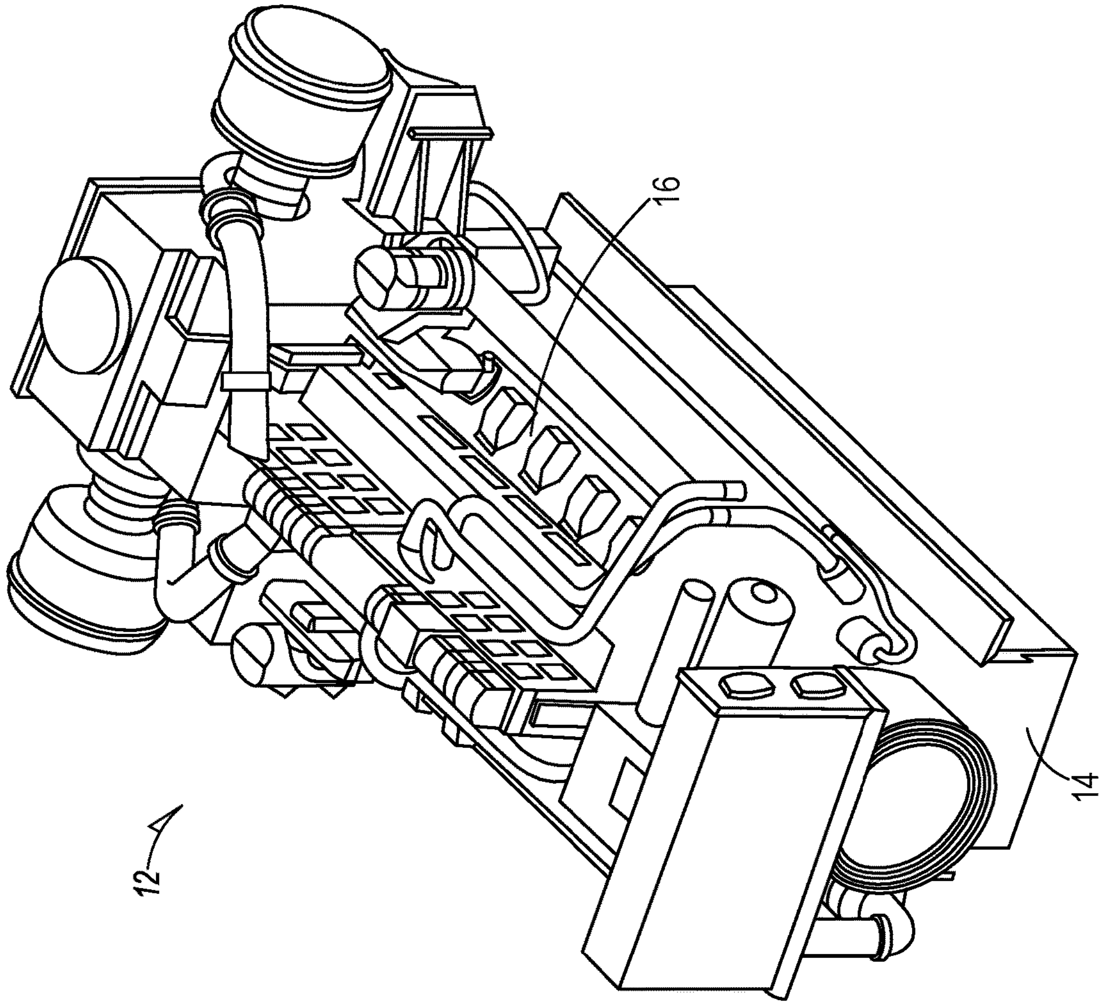
FIG. 1 is a perspective view of an internal combustion engine having a piston according to one or more examples.

Referring now to FIG. 1, an internal combustion engine 12 is shown that may employ various embodiments of the piston constructed according to the principles set forth herein. The engine 12 may include an engine or cylinder block 14 in which the piston (not shown) reciprocates, and an engine or cylinder head 16 that may contain various engine components for the introduction of fluids into the bore/combustion chamber located in the engine block 14.

Figure 2:
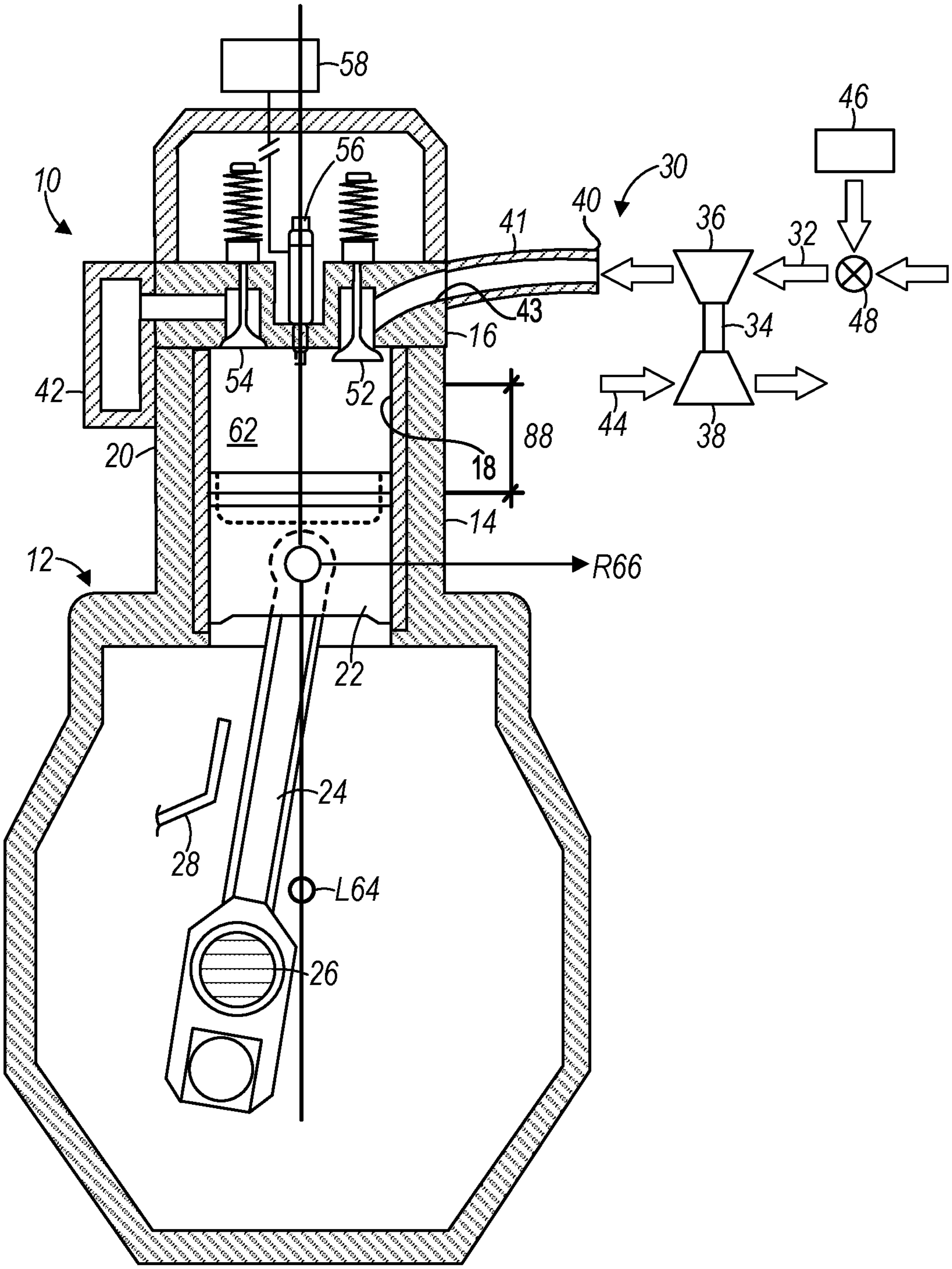
FIG. 2 is a cross-sectional view of the internal combustion engine of FIG. 1, showing, inter alia, a piston according to one or more examples.

Turning now to FIG. 2, a cross-sectional view of a combustion engine system 10 including the combustion engine 12 is shown. The engine system 10 may include an integral combustion engine 12 having the mentioned cylinder block 14 and cylinder head 16 attach to the cylinder block 14. One or more combustion cylinders 18 may formed in the cylinder block 14. That is, while only a singular cylinder is shown, the internal combustion engine system 10 may include a multi-cylinder engine and the description provided herein shall be understood to apply equally to the multiple cylinders and supporting systems or devices. In one or more examples, the several cylinders may be arranged in an in-line pattern, V-pattern, radial pattern, or another pattern.

The cylinder 18 may include a cylinder liner 20 and a piston 22 may be movable in cylinder 18 between a bottom-dead-center (BDC) position and a top-dead-center (TDC) position, the distance between these positions defining a compression height 88. Engine 12 may be particularly adapted for a four-stroke engine cycle, but other engine cycles may also be provided. That is, for each power stroke of the piston, an intake, compression, and exhaust stroke may also be provided.

The piston 22 may be pivotally coupled to a first end of a connecting rod 24 at a wrist pin, for example, and the other end of the connecting rod 24 may be coupled to crankshaft 26. The up/down movement of the piston 22 may, thus, drive rotational motion of the crank shaft. In addition, an oil sprayer 28 may be oriented to spray cooling and lubricating oil onto an underside of piston 22. The sprayed oil may be received into an oil gallery within the piston to assist in maintaining a suitable piston temperature.

Engine system 10 may also include an intake system 30. Intake system 30 may include an intake conduit 32 constructed to convey intake air for combustion into cylinder 18. Intake system 30 may also include an intake manifold 40 and an intake runner 41 extending from intake manifold 40 to an intake port 43 feeding cylinder 18. The intake manifold 40 may be coupled to a plurality of intake runners each extending to one of a plurality of cylinders. Engine system 10 may also include turbocharger 34 having a compressor 36 positioned to pressurize an incoming flow of intake air in response to rotation of a turbine 38. Engine system 10 may also include an exhaust manifold 42 configured to receive a flow of exhaust from cylinder 18 and to convey the same by way of an exhaust conduit 44 to turbine 38.

Engine system 10 may also include a fuel admission valve 48 positioned to admit flow of fuel from a fuel supply 46 to intake conduit 32. The illustrated arrangement may be a fumigated fuel admission arrangement. In other examples, engine system 10 may be port injected, including a fuel injection valve extending into or close to intake port 43, or manifold injected. It is contemplated that engine system 10 may operate on a gaseous fuel, such as natural gas. Natural gas or other gaseous fuels may be supplied from a pressurized fuel tank, a gas line, from a mine, or various other sources. Engine system 10 may also be operated on various fuel blends including natural gas and gaseous molecular hydrogen, or various other gaseous hydrocarbon fuels and blends such as methane, ethane, biogas, landfill gas, or still others.

An intake valve 52 is shown supported in engine head 16 and movable to open or close fluid communications between intake port 43 and cylinder 18. Analogously, an exhaust valve 54 selectively fluidly connects cylinder 18 to exhaust manifold 42. In one or more examples, a total of two intake valves and a total of two exhaust valves may be provided for each cylinder in an engine. Engine system 10 may also be spark-ignited and include a sparkplug 56 positioned to extend through engine head 16 into cylinder 18 to produce an electrical spark for igniting a mixture of fuel and air in cylinder 18. Sparkplug 56 may be electrically connected to an electronic control unit 58 or another suitable electrical or magnetic device for generating a spark at a spark gap in cylinder 18. Still other implementations could employ a prechamber sparkplug providing a prechamber within or fluidly connected to cylinder 18 for igniting a prechamber charge that ignites a main charge of a fuel and air in cylinder 18 according to well-known principles.

In particular examples of the present disclosure, cylinder 18 may define a combustion chamber 62 arranged between the piston 22 and a bottom surface of the engine head 16. The cylinder may include a longitudinal axis L64, and a radial direction R66 perpendicular to the longitudinal axis L64.

Figure 3:
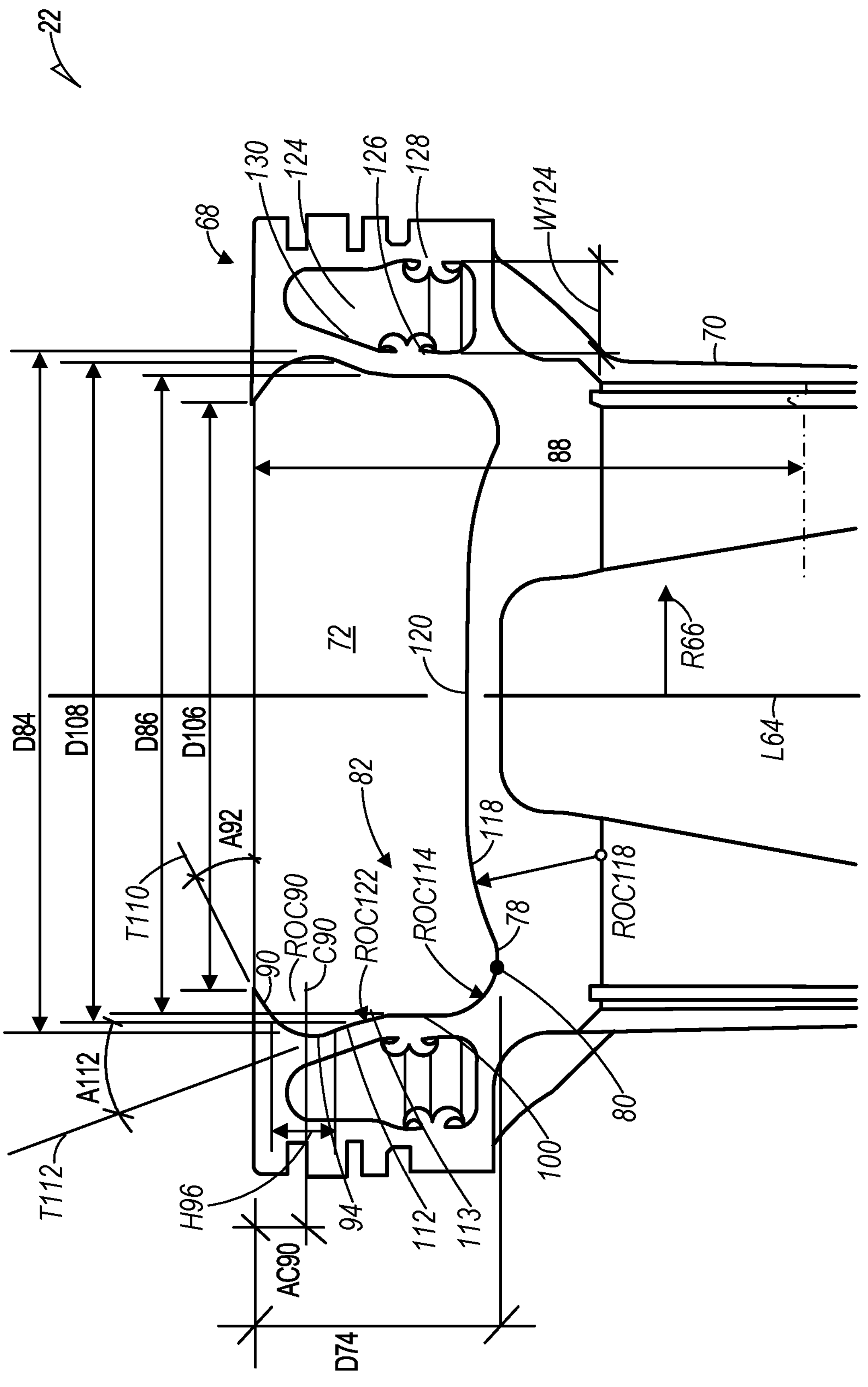
FIG. 3 is a cross-sectional view of the piston, according to one or more examples.

Referring now to FIG. 3, further details of the piston for use in the engine system 10 or another engine system may be described. As shown, the piston 22 may have an annular body including a generally annular crown portion 68 having a longitudinal axis. It is to be understood that the annular body of the piston 22 may itself define a longitudinal axis and a radial direction when not in the bore of the engine, but would such longitudinal axis and radial direction of the piston would be coincident or nearly coincident with those of the bore 18 when installed in the bore 18. Also, a skirt 70 is shown that may be a full skirt in some embodiments of the present disclosure. This may not be the case in other embodiments of the present disclosure. The skirt and the crown portion may be unitary, integral, etc.

The piston 22 may also include a contoured combustion bowl 72, and in the sectioned plane of FIG. 3, which contains the longitudinal axis L64 and the radial direction R66, defines a maximum axial depth D74 measured from a planar squish surface 76 (or a plane containing this surface) to a bottom concave arcuate surface 78 defining a bottom extremity 80 of a swirl pocket 82 (so called since it promotes mixing and atomization of the fuel in the air to help improve combustion efficiency). A ratio of the compression height 88 of the piston 22 to the maximum axial depth D74 may range from 2.05 to 2.475 (e.g., about 2.26) in some embodiments of the present disclosure. Such a range may be considered to provide a low geometric compression ratio. In such an embodiment, a ratio of a maximum diameter D84 of the combustion bowl defined by the concave arcuate side surface to a minimum diameter of the combustion chamber defined by a cylindrical surface (see D86) may range from 0.94 to 1.14 or a ratio of 1.02 to 1.08 may be provided.

Also, the contoured combustion bowl 72 may include a reentrant surface 90 extending from the planar squish surface 76 at a reentrant angle A92 in the sectioned plane of FIG. 3, and a concave arcuate side surface 94 that extends axially downwardly from the reentrant surface 90 defining an axial height H96 of the concave arcuate side surface 94. In some embodiments the reentrant angle ranges from 28.0 degrees to 32.0 degrees or a reentrant angle of 30 degrees may be provided. A ratio of the compression height 88 to the axial height H96 ranges from 4.0 to 13.0, or more specifically 8.0 to 10.0 (may be approximately 8.7). It should be noted that the compression height is most accurately portrayed in FIG. 2, as what is shown in FIG. 3 is an approximation of the compression height as it generally represents the amount of movement of the piston. It is noted that the piston may be slightly above bottom dead center in FIG. 2 and, as such, the bottom of the compression height is slightly below the top surface of the piston.

More specifically, the concave arcuate side surface 94 of the swirl pocket 82 may be spaced axially away from the planar squish surface 76 (i.e., other surfaces are interposed such as the reentrant surface 90, etc.), as well as the bottom concave arcuate surface 78. For example, the swirl pocket 82 may include a cylindrical surface 100 (i.e. has less than 7.0 degrees of a draft angle) that defines a minimum diameter D86 of the combustion bowl 72 that ranges from 111.0 millimeters to 114.0 millimeters in some embodiments of the present disclosure. Also, a ratio of the maximum axial depth D74 of the contoured combustion bowl 72 to the axial height H96 of the concave arcuate side surface 94 may range from 2.6 to 5.6 (may be about 3.9) in some embodiments of the present disclosure.

Specific geometric values may include the following. A small radius may connect the planar squish surface 76 to the reentrant surface 90 in some embodiments of the present disclosure (e.g., may have a value of 0 to 0.2 mm (or about 0.1 mm in the sectioned plane of FIG. 3)). In addition, the planar squish surface 76 (with the small radius, if present) may define an entry opening diameter D106 that ranges from 100.0 millimeters to 106.0 millimeters or a diameter D106 of 103.0 millimeters may be provided. Where the entry opening is a round shape, the area of the entry opening may, thus, range from approximately 7854 $mm^2$ to approximately 8825 $mm^2$, or an area of approximately 8332 $mm^2$ may be provided. Similarly, the concave arcuate side surface 94 defines a minimum arcuate surface diameter D108 that ranges from 115.0 millimeters to 118.0 millimeters, while the maximum axial depth D74 of the contoured combustion bowl 72 ranges from 41.0 millimeters to 44.0 millimeters. Other dimensional ranges are possible in other embodiments of the present disclosure such as when the design is scaled up or down, etc.

Still referring to the sectioned plane of FIG. 3, the crown portion 68 may include the top squish surface 76 and the reentrant surface 90 that extends axially downwardly and radially outwardly from the top squish surface 76 that defines a tangent T110 that forms a reentrant angle A92 with the top squish surface 76 that ranges from 28 degrees to 32 degrees, or an angle of 30 degrees may be provided. The reentrant surface 90 may take various shapes including arcuate, or conical as shown in FIG. 3. Where the reentrant surface 90 is conical, the tangent T110, and the reentrant surface 90 may be coincident when viewed in cross section as in FIG. 3.

As also alluded to earlier herein, the swirl pocket 82 further includes a concave arcuate surface (e.g., concave arcuate side surface 94) extending from the reentrant surface 90, defining a radius of curvature ROC90 that ranges from 8.5 millimeters to 10.5 millimeters in the sectioned plane of FIG. 3 in some embodiments of the present disclosure. If so, the center C90 of this radius of curvature may be disposed an axial distance AC90 from the top squish surface 76 ranging from 9.5 millimeters to 11.0 millimeters in some embodiments of the present disclosure. Also, the concave arcuate surface may be an exact radius, but not necessarily so. As used herein, the term "arcuate" means any surface that is not conical or planar, and may include a radius, radii, an ellipse, a spline, a polynomial, etc.

Furthermore, a converging surface 112 may extend radially inwardly from the concave arcuate side surface 94 toward the longitudinal axis L64, defining a lower tangent T112 that forms an acute angle A112 with the longitudinal axis L64 in the sectioned plane of FIG. 3 that ranges from 18.0 degrees to 22.0 degrees in some embodiments of the present disclosure. As with the reentrance surface, the converging surface 112 may also be conical, but not necessarily so. A convex transition surface 113 may also be provided extending from a lower end of the converging surface 112 and leading to the cylindrical surface 100.

As mentioned previously herein, the swirl pocket 82 may have a cylindrical surface 100 extending axially downwardly from the converging surface 112 or from the convex transition surface. The swirl pocket 82 may also include a concave bottom extremity defining surface (e.g., see bottom concave arcuate surface 78 defining a bottom extremity 80) extending from the cylindrical surface 100. A convex arcuate surface 118 may extend upwardly from the concave bottom extremity defining surface 78 to a flat plateau surface 120 (i.e., this surface may be flat within 0.5 mm or less) that is perpendicular to the longitudinal axis L64.

With continued reference to FIG. 3, the transition surface 113 may be defined by a radius ROC122 and may connect the converging surface 112 to the cylindrical surface 100. The radius of curvature ROC122 may range from 13.0 millimeters to 17.0 millimeters in some embodiments of the present disclosure. Plus, the concave bottom extremity defining surface 78 may have a radius of curvature ROC114 that ranges from 8.0 millimeters to 12.0 millimeters, while the convex arcuate surface 118 may have a radius of curvature ROC118 that ranges from 50.0 millimeters to 54.0 millimeters in some embodiments of the present disclosure.

The present piston geometry may be advantageous by providing a relatively large bowl volume, which helps to reduce and/or control the compression ratio, while also providing a relatively small area for gas to enter the bowl 72. The small area for gas to enter the bowl 72 may increase the squish velocity and can help to increase the fuel efficiency. In addition, the relatively sharp reentrant angle A92 can contribute to more turbulent flow of the gas passing into the combustion bowl 72 due to the abrupt broadening of the available space below the more constricted entry opening. This can also improve the fuel efficiency. In one or more examples, the ratio of the volume of the combustion bowl to the area of the entry opening may range from 45 mm to 52 mm or a ratio of 48.5 mm may be provided. In addition, the ratio of the combustion bowl volume to the reentrant angle A92 may range from approximately 12 cc/deg to approximately 15 cc/deg or a range of approximately 13-14 cc/deg may be provided. The ratio of the maximum depth D74 of the combustion bowl 72 to the reentrant angle A92 may also range from approximately 1.3 mm/deg. to approximately 1.5 mm/deg. Still further the ratio of the minimum bowl diameter D86 to the reentrant angle A92 may range from approximately 3.6 mm/deg. to approximately 3.9 mm/deg.

In addition to the above geometries that are focused on power and combustion efficiency, further geometry may be provided to control temperatures of the piston 22. For example, in the sectioned plane of FIG. 3, the contoured combustion bowl 72 may be radially surrounded by an annular cooling gallery 124 that defines a maximum annular radial width W124. The cooling gallery may be arranged radially proximate to the swirl pocket 82. In some embodiments, a ratio of the minimum diameter D86 of the combustion bowl 72 to the maximum annular radial width W124 may range from 6.3 to 7.7.

More particularly, the annular cooling gallery 124 may define a radially inner cylindrical surface 126, and a radially outer cylindrical surface 128 that defines the maximum annular radial width W124 of the annular cooling gallery 124. Also, the annular cooling gallery 124 may further include a conical surface 130 that is radially proximate to the conical converging surface 112, and that is parallel to the conical converging surface 112. Hence, the local wall thickness of the piston 22 between these features is maintained relatively constant.

The configuration, ratios and dimensional ranges of any of the features of any of the embodiments discussed herein may be altered to be different than what has been explicitly discussed or shown depending on the application.

The piston may be fabricated from steel (e.g., tool steel, stainless steel, etc.), cast aluminum alloy, forged aluminum alloy or other suitable material that is durable, corrosion resistant, etc. The geometry of the crown portion may be formed during the casting or forging process and then may be rough machined and/or finish machined if necessary. Suitable machining processes may include milling, turning, electrical discharge machining, etc.

Since a turning process is used to create some or all of the finished geometry of the piston, it can be readily understood by one skilled in the art that most, almost all, or all of the finished geometry of these components may not vary, or may not vary significantly, along the circumferential direction about the longitudinal axis.

INDUSTRIAL APPLICABILITY

The presently described piston and piston bowl are particularly adapted to meet engine performance goals and fit into a particular piston architecture. The bowl may have help to maximize volume due to its depth and diameter, providing for a low geometric compression ratio. At the same time, the reentrant feature at the bowl opening may provide for a relatively small bowl opening, which may generate a relatively high squish velocity and helps to increase the total kinetic energy in the in-cylinder gas mixture. This reentrant feature may also provide for the mentioned high squish velocity without sacrificing bowl volume. Also, the ratio of combustion volume in the bowl to cooling volume in the cooling gallery may provide for higher cooling capacity. These combinations of features may provide reduced piston temperatures, reduced unburned hydrocarbons, and improved combustion efficiency when the engine is operated at is its rated load.

In practice, a piston, a crown portion of a piston, a combustion chamber, and/or an engine assembly using any of these components according to any embodiment described herein may be provided, sold, manufactured, and bought etc. as needed or desired in an aftermarket or OEM (original equipment manufacturer) context. For example, a crown portion or a piston may be used to retrofit an existing engine already in the field or may be sold with an engine or a piece of equipment using that engine at the first point of sale of the piece of equipment.

The inventors have found that the selected bowl geometry facilitates a balance between low compression ratio, high squish velocity, and effective cooling of the bowl rim and top land. Other designs may be able to achieve the same low compression ratio, but would likely sacrifice the desired squish velocity or the desired amount of cooling.

Put another way, various embodiments of the present disclosure break the tradeoff between increasing power output using a low compression ratio, and improving combustion efficiency simultaneously.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

The above detailed description is intended to be illustrative, and not restrictive. The scope of the disclosure should, therefore, be determined with references to the appended claims, along with the full scope of equivalents to which such claims are entitled.

What is claimed is:

1. A piston configured to reciprocate in a bore of an engine, the piston comprising:

an annular body including a combustion bowl defining a volume and surrounded on a top side thereof by an annular crown portion defining a top squish surface with an inner edge defining an opening to the combustion bowl, the opening having an area for combustion gases to enter the bowl during a compression stroke of the piston, wherein the combustion bowl comprises a reentrant surface that extends axially downwardly and radially outwardly relative to the top squish surface and defines a tangent that forms a reentrant angle with the top squish surface that ranges from 28.0 degrees to 32.0 degrees;

the combustion bowl further including a concave arcuate surface extending from the reentrant surface, a converging surface extending radially inward from the concave arcuate surface, a transition surface extending from the converging surface, a bottom extremity defining surface, and a cylindrical surface extending axially upwardly from the bottom extremity defining surface; and a minimum diameter of the combustion bowl, axially below the opening to the combustion bowl, is defined by the cylindrical surface.

2. The piston of claim 1, wherein the reentrant surface is conical.

3. The piston of claim 1, wherein the combustion bowl comprises a swirl pocket having the reentrant surface and the concave arcuate surface extending from the reentrant surface and having a radius of curvature that ranges from 8.5 millimeters to 10.5 millimeters.

4. The piston of claim 3, wherein the converging surface extends toward a longitudinal axis, defining a lower tangent that forms an acute angle with the longitudinal axis that ranges from 18.0 degrees to 22.0 degrees.

5. The piston of claim 4, wherein the converging surface is conical.

6. The piston of claim 5, wherein the cylindrical surface extending axially downwardly from the converging surface, and the bottom extremity defining surface is concave and extends from the cylindrical surface, and the swirl pocket further comprises a convex arcuate surface extending upwardly from the concave bottom extremity defining surface to a flat plateau surface that is perpendicular to the longitudinal axis.

7. The piston of claim 6, wherein the swirl pocket further includes a radius connecting the converging surface to the cylindrical surface having a radius of curvature ranging from 13.0 millimeters to 17.0 millimeters, the concave bottom extremity defining surface has a radius of curvature that ranges from 8.0 millimeters to 12.0 millimeters, and the convex arcuate surface has a radius of curvature that ranges from 50.0 millimeters to 54.0 millimeters.

* * * * *